United States Patent [19]

Menand et al.

[11] Patent Number: 5,539,920
[45] Date of Patent: Jul. 23, 1996

[54] METHOD AND APPARATUS FOR PROCESSING AN AUDIO VIDEO INTERACTIVE SIGNAL

[75] Inventors: Jean-René Menand, Marina Del Rey; Alain Delpuch, Los Angeles, both of Calif.

[73] Assignee: Thomson Consumer Electronics, Inc., Indianapolis, Ind.

[21] Appl. No.: 234,144

[22] Filed: Apr. 28, 1994

[51] Int. Cl.⁶ .................................................. H04N 7/14
[52] U.S. Cl. ........................ 455/5.1; 348/10; 348/13; 348/461
[58] Field of Search ........................ 348/6, 7, 10, 12, 348/13, 461, 465, 466, 467; 455/5.1; H04N 7/14, 7/16, 7/173

[56] References Cited

U.S. PATENT DOCUMENTS

| | | | |
|---|---|---|---|
| 3,803,491 | 4/1974 | Osborn | 325/53 |
| 3,891,792 | 6/1975 | Kimura | 178/5.8 R |
| 4,264,925 | 4/1981 | Freeman et al. | 358/86 |
| 4,323,922 | 4/1982 | den Toonder et al. | 358/117 |
| 4,528,589 | 7/1985 | Block et al. | 358/122 |
| 4,965,825 | 10/1990 | Harvey et al. | 380/9 |
| 5,168,356 | 12/1992 | Acampora et al. | 358/133 |
| 5,191,573 | 3/1993 | Hair | 369/84 |
| 5,343,238 | 8/1994 | Lappington et al. | 348/12 |
| 5,421,031 | 5/1995 | De Bey | 348/12 X |

FOREIGN PATENT DOCUMENTS

| | | |
|---|---|---|
| 0169455 | 1/1986 | European Pat. Off. . |
| 0188364 | 7/1986 | European Pat. Off. . |
| 0624039A2 | 11/1994 | European Pat. Off. . |
| 2230667 | 10/1990 | United Kingdom . |
| WO95/10908 | 4/1995 | WIPO . |

*Primary Examiner*—Victor R. Kostak
*Assistant Examiner*—John W. Miller
*Attorney, Agent, or Firm*—Joseph S. Tripoli; Eric P. Herrmann; Ronald H. Kurdyla

[57] ABSTRACT

A method is disclosed for processing modules in an audio video interactive (AVI) receiver receiving a packet service including a plurality of modules, each module having a name and including time multiplexed transmission units, each transmission unit including a header packet containing the name of the module. First a request to perform a process on a module identified by a name is received and an entry containing the received name and requested process is inserted into a list of entries. A header packet in the packet service is then detected. If the name in the detected header packet matches a name in an entry in the list, packet processing circuitry performs the process in the matching entry and a message is sent indicating that the process has been performed.

25 Claims, 4 Drawing Sheets

METHOD AND APPARATUS FOR PROCESSING AN AUDIO VIDEO INTERACTIVE SIGNAL

The present invention relates to a method and apparatus for receiving and processing an audio video interactive (AVI) signal.

Interactive television systems have been proposed in which a television receiver includes a processor programmable by the broadcaster and capable of responding to data entered by the user, generating on-screen graphic displays overlaid upon the broadcast video, generating sounds combined with the broadcast audio and/or exchanging data with the broadcaster or other outside data processing service. In such a system, the broadcast location includes a computer system for generating interactive application program information, and combining the interactive application program information as an additional component with the video and audio components of the associated television signal. The processor in the television receiver receives the interactive application program information from the broadcaster, executes the interactive application program represented by that information, generating the graphics and sounds to be combined with the television video and audio, and processing user inputs received via a remote control unit.

In a proposed AVI system, the AVI signal from the broadcaster is broadcast in the form of a packet data stream, including a plurality of time multiplexed packet services. Each packet service carries a different signal component of the AVI signal. For example, one service carries the video component, another carries the audio component, and another carries the interactive application program information. There may be still other services carrying stereo and SAP audio channels, and/or closed captioning information, etc. In addition, some packet data streams may include packet services carrying components for more than one AVI program. Each packet service has a unique service component identifier (SCID) associated with it and the packets in that packet service each include that service identifier. See U.S. patent application Ser. No. 08/234,773 APPARATUS AND METHOD FOR FORMULATING AN INTERACTIVE TV SIGNAL, filed Apr. 28, 1994 by Jean Rene Menand, incorporated by reference, for a more detailed description of how such a packet data stream is formed.

Further, in the proposed AVI system, one packet service carries a program guide and includes a predetermined service identifier. The data carried by the program guide packet service associates the components of an AVI program with the service identifiers of the packet services carrying those components. Using this data, the packet services carrying the components of the desired AVI program may be extracted from the packet stream.

The components in the AVI signal packet data stream are carried by one or more transmission units, each consisting of a plurality of packets. A first packet in any transmission unit is a header packet, and the remaining packets in the transmission unit are associated data packets. The header packet contains information about the following data, and the associated data packets carry the data making up that portion of the component. Different transmission units may include different numbers of data packets, and the partitioning of the module into transmission units may be influenced by the timing necessary to deliver complete modules to the viewer locations at desired times, or other real time considerations.

The interactive application program information component consists of one or more code modules (containing executable code), possibly one or more data modules and a directory module which includes data describing the code and data modules making up the interactive application program component. These modules are continuously repeated in the application program component flow. The modules are carried by transmission units, as described above, in which the header packet further contains the location within the module where the data in the following data packets belongs.

A processor in an AVI receiver first extracts the directory module from the data flow, and utilizes the information contained in the directory to determine which code module is first to be executed. That code module is then extracted from the data flow and loaded into a known location in memory. When the initial code module has been completely loaded into memory, the processor begins to execute that code module. During the course of its execution, that code module may request data from data modules identified in the directory module. Those data modules are then extracted and loaded into memory. When the data module has been completely loaded into memory, the requesting code module is notified, and execution continues to process that data. It is also possible for one code module to chain to a subsequent one. In such a case, the current code module issues a request to chain to a new code module listed in the directory module, and its memory space is freed. The requested code module is then extracted from the data flow, and loaded into memory. When it has been completely loaded into memory, it is executed. Other functions are possible, and will be described below.

If the memory has sufficient capacity, more than one code module may simultaneously be stored in respective portions of the memory. In such a case, chaining from one module to another entails simply beginning execution of the new module, obviating the requirement to wait until the new module has been loaded from the flow. It is also possible to load more than one data module in memory, but because data modules may change more often than code modules, it is envisioned that data modules will be extracted from the data flow when they are required by code modules.

A processor in a proposed AVI receiver need not include any mass storage, or preloaded AVI programs. Instead, because the modules carried in the interactive application program packet service are continuously repeated, any module may be extracted from the data flow when it is needed and no mass storage is necessary. Because of this, however, the processor in the AVI receiver must monitor the data flow continuously for required modules. A method and apparatus for efficiently monitoring the data flow, and processing desired modules as quickly as possible is required.

In accordance with principles of the present invention, an audio video interactive (AVI) receiver receives a packet service including a plurality of modules. Each module has a name and includes time multiplexed transmission units. Each transmission unit includes a header packet containing the name of the module. A method for processing modules in such a receiver includes the following steps. First, a request to perform a process on a module identified by a name is received and an entry containing the received module name and requested process is inserted into a list of entries. A header packet in the packet service is then detected. If the module name in the detected header packet matches a name in an entry in the list, packet processing circuitry performs the process in the matching entry. Finally a message is sent indicating that the process has been performed.

Apparatus in accordance with principles of the present invention includes a source of a packet data stream including a plurality of modules, each module having a name and including time multiplexed transmission units, and each transmission unit including a header packet containing the name of the module. A memory stores a request queue containing a plurality of entries each entry including a processing request and a name of a module. The memory also stores a header packet buffer including a location containing a module name. Request processing circuitry receives a request to perform processing on a module identified by a name and stores an entry in the request queue including the name of the identified module and the processing requested. A header packet memory storage controller stores header packets in the header packet buffer as they appear in the data stream, and generates a header packet received signal. Module processing circuitry, responsive to the header packet received signal, reads the module name from the header packet buffer, compares the module name in the header packet to the module names in each entry in the request buffer, and if the module name in the header packet matches an entry name, performs the processing requested in the matching request queue entry.

Figure 1:
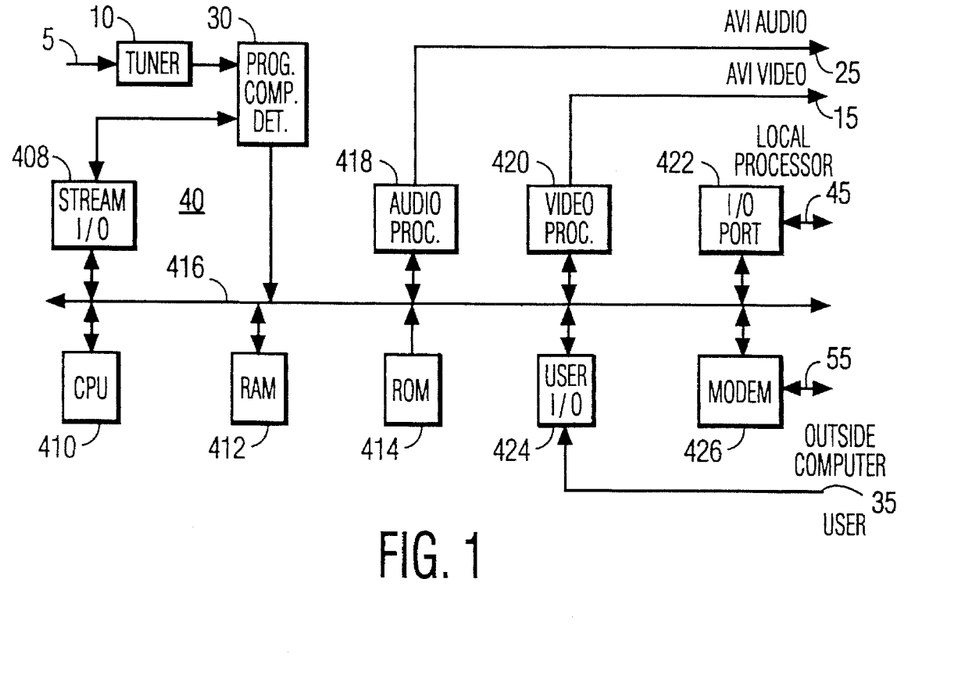
FIG. 1 is a block diagram of a portion of an AVI signal decoder, incorporating the present invention.

FIG. 1 is a block diagram of a portion of an AVI signal decoder, incorporating the present invention. A decoder as illustrated in FIG. 1 is installed in each viewer location at which it is desired to participate in AVI programs. In FIG. 1, a transport mechanism (not shown) is coupled to an input terminal 5 of the decoder. Input terminal 5 is coupled to an input terminal of a tuner 10. An output terminal of tuner 10 is coupled to a data input terminal of an AVI program component detector 30. A data output terminal of program component detector 30 is coupled to a system bus 416 of a processing unit 40. Processing unit 40 includes a central processing unit (CPU) 410, a read/write memory (RAM) 412 and a read-only memory (ROM) 414 coupled together in a known manner via the system bus 416. A stream I/O adapter 408 is bidirectionally coupled between the system bus 416 and a control terminal of the program component detector 30.

An audio processor 418, coupled to the system bus 416, provides an audio signal to AVI audio output terminal 25, and a video processor 420, also coupled to the system bus 416, provides a video signal to AVI video output terminal 15. Further input and output facilities are provided by an I/O port 422, coupled to a collocated local processor (not shown) via a bidirectional terminal 45; user I/O adapter 424, for receiving data from a user via an input terminal 35; and a modem 426, coupled to an outside computer (not shown) via a bidirectional terminal 55; all also coupled to the system bus 416 in a known manner. Other equipment, e.g. math processors, other I/O adapters, etc., may be coupled to system bus 416 in a known manner. In addition, a bus extender may be included for coupling to other equipment in enclosures external to the decoder enclosure.

In operation, the transport mechanism, which, for example, may be a direct RF satellite link, a cable system feed or a fiberoptic link to the decoder, carries a plurality of AVI signals, any one of which may be selected by the user for viewing. In a direct satellite link, for example, a plurality of AVI data streams may be frequency multiplexed on the transport mechanism by modulating respective RF carrier signals. Each RF carder signal is rebroadcast from a respective transponder in the satellite to the viewer location. Tuner 10 selects a desired RF modulated signal, under the control of processor 40, in a known manner. For example, in the direct satellite system, the RF modulated signal containing the packet services carrying the components of the desired AVI program signal is tuned by a known RF tuner. The output of tuner 10 is a baseband digital packet data stream containing those packet services.

CPU 410 requests desired packet services from the program component detector 30 by writing the desired service identifiers and RAM 412 buffer locations into appropriate service component identifier (SCID) and direct memory access (DMA) controller registers in the program component detector 30 via the stream I/O adapter 408. The program component detector 30 then monitors the packet data stream for the desired packet services. When header packets from any of the desired packet services are received, they are stored in a predetermined header packet buffer in the RAM 412 using known DMA write techniques, and a header packet interrupt is generated. When data packets from any of the desired packet services are received, they are stored in the previously specified buffer locations in the RAM 412 also using known DMA write techniques. When all the data packets in a transmission unit have been received, a data complete interrupt is generated. Reception of header and/or data packets from a packet service may be enabled and disabled under control of the CPU 410. See U.S. patent application Ser. No. 08/232,787 PACKET VIDEO SIGNAL INVERSE TRANSPORT PROCESSOR MEMORY ADDRESS CIRCUITRY, by K. E. Bridgewater et al. filed Apr. 22, 1994 and incorporated by reference, for a more detailed description of the program component detector 30.

For example, when a new RF modulated signal is tuned by the tuner 10, the packet service containing the program guide is requested by the CPU 410 by supplying the fixed program guide service identifier to a service identifier register in the program component detector 30. When the data in the program guide packets has been received and stored in memory, that data allows the CPU to request the packet data services for the desired AVI program.

After packets in the requested packet services are received by the program component detector 30, and are written via DMA into the previously specified buffer locations in RAM 412, the video processor 420 and audio processor 418 read the data from the RAM 412 buffer locations associated with their respective packet services, using known DMA read techniques, under control of the program component detector 30. Video processor 420 and audio processor 418 then decode the compressed and encoded data to produce the AVI video signal at output terminal 15, and the AVI audio signal at output terminal 25, respectively. It is also possible for CPU 410 to cooperate with the video processor 420 and/or audio processor 418 in the decoding process. The data component packet service packets are processed under the control of the CPU 410 in a manner described below.

As described above, whenever a header packet from a requested packet service is received by the program component detector 30, it is stored in a predetermined location in RAM 412 for that packet service, and a header packet interrupt signal is generated for the CPU 410. In response to the header packet interrupt signal, an interrupt handler is executed which analyses the contents of the header packet and either appropriately updates the RAM 412 buffer locations in the DMA registers in the program component detector 30 and enables the DMA transfer, or disables the DMA transfer if the transmission unit is not desired. Once the DMA transfer is enabled, the data in the data packets is then loaded into RAM 412 under DMA control. When the loading of the data packets is completed, the program component detector 30 generates a data complete interrupt signal. In response to the data complete interrupt signal, an interrupt handler is executed to perform "clean-up" functions and prepare for the next header packet.

Figure 2:
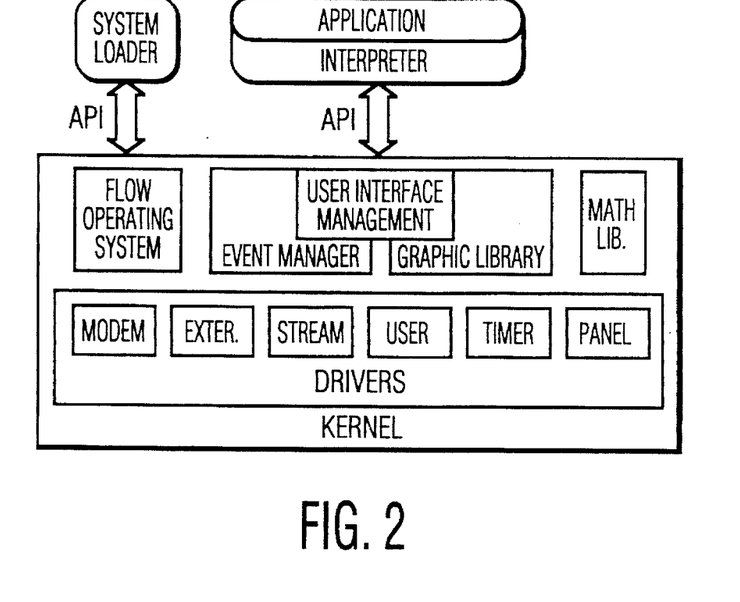
FIG. 2 is a software structure diagram of the software executed by the processing unit 40 illustrated in FIG. 1.

FIG. 2 is a structure diagram of software 200 executed by the processing unit 40 illustrated in FIG. 1. FIG. 2 illustrates the major software components making up the AVI processing multitasking operating system. In FIG. 2, all the components are stored in the ROM 414, except the application program, indicated by cross-hatching. The application program is carried by the data component of the AVI signal, is received from the broadcast location and is stored in RAM 412. The software components illustrated in FIG. 2 represent executable code and associated constant data. As the code executes, it may generate and access variable data, which is stored in the RAM 412.

In the proposed AVI broadcast system, different decoders may use CPUs using different instructions sets, e.g. from different manufacturers. In this system, the application program is processor independent intermediate code. The software in each decoder includes a component which interprets the intermediate application code (INTERPRETER). This enables the broadcast application program to be executed on decoders containing any type of CPU 410. That interpreter will read the AVI data component instructions in intermediate code from the RAM 412, manipulate memory, and interact with the hardware through other software components via an application programming interface (API). This API, which is basically a list of subroutines available to an application program and the information necessary to call them, is published and may be used by the application programmer to access the decoder elements.

A math library performs all the functions needed to implement integer and floating point arithmetic. A flow operating system controls all the drivers necessary to monitor the data component of the AVI signal, and process requested modules, as will be described in more detail below. A user interface management component handles all the user interaction, and utilizes a graphics library, and an event manager to communicate with the user. The graphics library performs all the generation of graphic images to overlay on the received AVI video, and uses the math library for drawing complex curves.

The different software components of the decoder software communicate with other asynchronously by sending messages to each other. Each program component has a message queue and operates by repeatedly reading the next message from the queue, processing that message, possibly sending a message to another program component, and, if no more messages are pending, waiting for the next message. The event manager manages the communication of these messages among the other software components by properly routing the messages and maintaining the message queues.

Each hardware adapter also includes an associated software driver. The driver performs the actual interaction between the CPU 410 and the registers in the associated hardware adapter via the system bus 416. For example, there are drivers for the modem 426, the external I/O port 422, the stream I/O adapter 408 and the user I/O 424. In addition, separate drivers maintain a software timer and operate the front panel of the decoder. These drivers are closely dependent on the event manager. All of the above components use common functions provided by a multitasking kernel. For example, the kernel maintains process priorities, active task queues, signals, semaphores, preemptive task switching clock ticks, interrupts (hardware and software), and process stacks. In addition, the kernel provides hardware initialization and initiation of the first system task, which is a system loader.

At initiation, the system loader executes API calls to the flow operating system, which in turn calls the stream driver to send the appropriate data to the program component detector 30 via the stream I/O adapter 408. These API calls from the system loader initiate a scan of the data component packet service for the directory module in a manner described in more detail below. When the directory module is found, it is loaded into RAM 412, and checked to see if all of the required resources to execute that program are available. If so, then the system loader initiates a scan of the AVI data component for the first module, termed an autostart module, which will initiate the AVI program. When the autostart module is located, it is extracted from the data component packet service and loaded into RAM 412. This autostart module is in the form of intermediate code, and is executed by being interpreted by the interpreter. The autostart module performs the remainder of the initialization and begins execution of the AVI program. This program may possibly load other code and data modules, and chain to another code module, all via API calls. In this manner, the system loader operates in the same manner as a classic UNIX® shell.

In addition, the system loader continues to scan the data component packet service comparing transmitted directory modules to the current directory module in RAM 412. If the transmitted directory module is different than that stored in RAM 412, it indicates that the data component packet service has changed, for example, such as when a viewer changes channels, or an interactive commercial is being broadcast. In this case, a message is sent to the application program via the event manager using the API. In response to this message, the application program deallocates all its resources, and maintains only a minimal presence in the processing element 40. For example, the memory used to store all code and data modules may be freed, and only the execution state of the application kept in RAM 412. When the minimization of the application program has completed, a message is sent to the system loader.

The system loader then allocates the resources necessary to execute the AVI program represented by the new directory module. When a new directory module is detected in the AVI data component packet service, a list of previously minimized applications is searched, and if the application represented by the new directory is present, that application is resumed by reloading the necessary code and data modules from the data component flow, and resuming execution from where it had previously been halted. This may happen at the end of an intervening interactive commercial. This process may be recursive, where a second AVI program may, itself, be interrupted by a third AVI program, and later reactivated.

Figure 3:
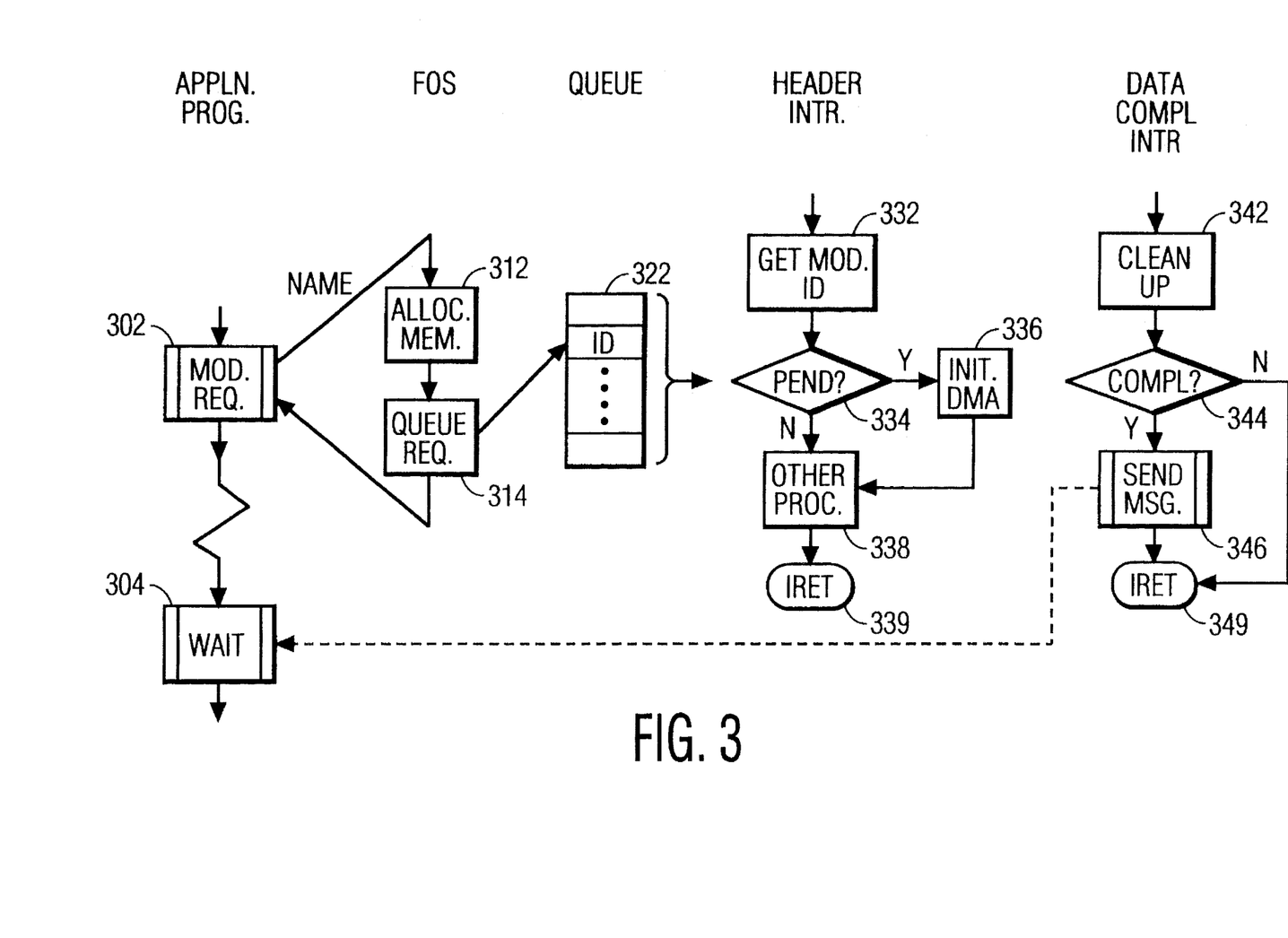
FIG. 3 illustrates flow diagrams and memory layout diagrams useful in understanding the extraction of modules from the data component in an AVI program.
Figure 4:
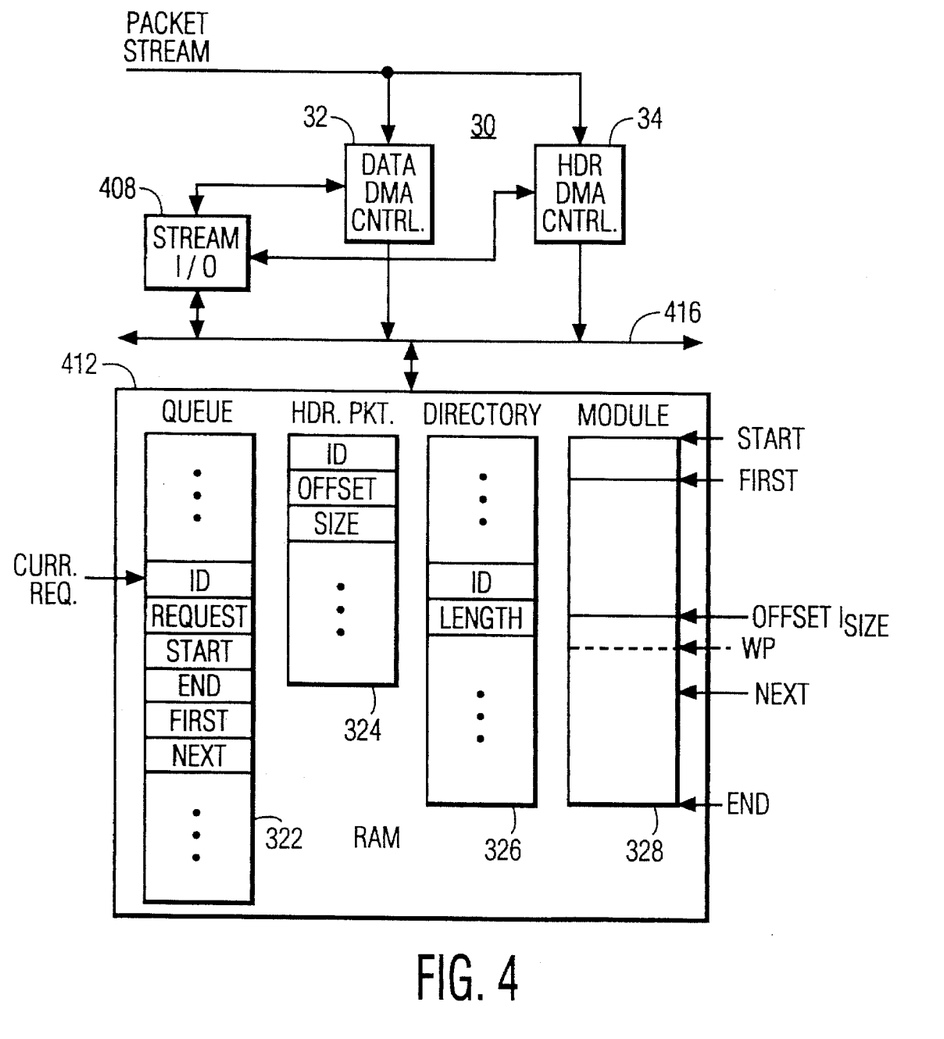
FIG. 4 is a diagram, partially in block form and partially in memory layout form also useful in understanding the extraction of modules from the data component of an AVI program.

FIG. 3 illustrates flow diagrams and memory layout diagrams and FIG. 4 is a more detailed block diagram of the program component detector 30 (of FIG. 1) and a more detailed memory layout diagram useful in understanding the extraction of modules from the data component in an AVI program. In FIG. 4, the baseband digital packet stream from tuner 10 (of FIG. 1) is coupled to respective data input terminals of a data DMA controller 32 and a header packet DMA controller 34 within the program component detector 30. Respective data output terminals of data DMA controller 32 and header packet DMA controller 34 are coupled to the system bus 416 of the processing unit 40. The stream I/O adapter 408 is coupled between the system bus 416 and respective control input terminals of the data DMA controller 32 and the header packet DMA controller 34. In operation, stream I/O adapter 408 supplies control information, e.g. buffer location start and end addresses, read and write addresses, and transfer counts, in known manner from CPU 410 (of FIG. 1 to the data DMA controller 32 and the header packet DMA controller 34. Stream I/O adapter 408 may then enable the data DMA controller 32 and/or the header packet DMA controller 34 to transfer data or header packets, respectively, from the packet stream to the buffer in a known manner, or disable such transfers, under control of the CPU 410. When the data DMA controller 32 completes a data transfer, it generates a data complete interrupt for CPU 410. When the header packet DMA controller 34 completes loading a header packet, it generates a header packet interrupt for CPU 410.

Also in FIG. 4, the RAM 412 is represented by a large block, and data structures are represented by smaller blocks within the large block. The blocks in FIG. 4 are schematic only, and are not meant to illustrate either absolute or relative locations or sizes allocated in the RAM 412 for the data structures. In 12, a module request queue 322, a header packet buffer 324, a directory module buffer 326 and a module buffer 328 data structures are illustrated. Fields of information within the data structures are illustrated as horizontal slices containing the name of the type of information contained in that field. These will be discussed in detail below.

FIG. 3 illustrates the procedure followed in extracting a module from the data component packet service and storing it in a buffer in RAM 412. Similar procedures are followed for other module processing, as will be described below. In FIG. 3, actions taken in an application program (or the system loader) are illustrated in the left hand column under the heading "APPLN PROG.". In block 302, the application program, using the API, makes a request to the flow operating system to load a module having the identifier ID from the AVI program component packet service. As described above, API calls are basically subroutine calls to operating system functions. The program execution is, thus, transferred to the flow operating system (FOS). Actions taken by the FOS are illustrated in the next column to the right, under the heading "FOS." Because the request involves the loading of a module, in block 312 the FOS requests a memory allocation from the memory manager of sufficient size to contain the module. For example, if the requested module is a code or data module, the previously stored directory module 326 (of FIG. 4) includes a field containing the length (LENGTH) of the module ID. In this case a memory manager allocates a module memory buffer (328 of FIG. 4) having a starting address START and an ending address END. Then, in block 314, information describing the request, e.g. the identifier ID of the module, the type of request REQUEST (in this case a request to extract and load a module) and the allocated buffer starting address START and ending address END, are all stored in the entry in the request queue (QUEUE) 322. The header packet DMA controller 34 is then enabled to load header packets into the RAM 412, when they occur in the packet stream.

If the request is for the directory module, its length is not known a priori. In this case a relatively large memory allocation is requested. If this allocation turns out to be too small, the request is repeated, after requesting a larger memory allocation, until either the directory module is loaded, or it is determined that there is insufficient memory to load it, in which case the attempt to run the AVI program is abandoned.

The FOS then immediately returns to the calling application program. The application program is then able to perform other processing, for example issuing requests for other modules, other intializations, etc. When access to the requested module is required, the application program, in block 304, may issue an API call to a wait function in the kernel. This function suspends the execution of the application program until a message indicating the successful loading of the requested module is received by that application program. When such a message is received, the application program is reactivated to process that message. Alternatively, the application program may remain active, e.g. in order to respond more quickly to user inputs, and periodically poll its message queue for the message indicating successful loading of the requested module, and process the message when it is received.

As described above, the header packet DMA controller 34 loads header packets into a header packet (HDR PKT) buffer 324 (of FIG. 4) in the RAM 412 previously allocated by the memory manager, and issues a header packet interrupt to the CPU 410. A portion of the processing performed by the header interrupt handler in the kernel is illustrated in the column headed "HEADER INTR" in FIG. 3. In block 332, the identifier of the module which is being carried in the transmission unit for which this is the header packet, is retrieved from a known location, ID, in the header packet buffer 324. In block 334, request queue 322 is examined to determine if there is a pending request for this module.

If there is a pending request for that module, then, in block 336, the data packet DMA controller 32 in the program component detector 30 is initialized with: the module buffer 328 starting address START and ending address END from the request queue 322; a write address which is the sum of the module buffer 328 starting address START and the transmission unit data offset OFFSET (i.e. START+OFFSET); and a last write address which is START+OFFSET+SIZE (or alternatively, a load count which is the size SIZE from the header packet buffer 324 in place of the last write address). The data packet DMA controller 32 is then enabled.

In block 338, if this is the first header packet received after the load request was made, a pointer to the first write address, FIRST, stored in the request queue 322, is initialized to the write address of this first transmission unit (i.e. FIRST=START+OFFSET). In addition, a pointer to the expected next write address, NEXT, also stored in the request queue 322, is also initialized to the write address of the first transmission unit (i.e. NEXT=START+OFFSET). Other processing is then performed in block 338, which will be described in more detail below. For example, a special pointer to the location in the request queue 322 of the request currently being processed, CURR REQ, is stored in a predetermined location (not shown) in RAM 412. Then, in block 339, the interrupt handler returns (339).

The data packet DMA controller 32 initializes a write pointer (WP) to the previously received write address (START+OFFSET) and loads data from the following data packets in the AVI program component packet service into sequential locations in the module buffer 328 in RAM 412. When all the data in the transmission unit has been loaded into RAM 412, the data complete interrupt is generated. A portion of the processing performed by the data complete interrupt handler in the kernel is illustrated in the right hand column headed "DATA COMPL INTR" of FIG. 3.

In block 342 clean-up functions related to the current status of the DMA transfer are executed. The current request pointer (CURR REQ), previously set in the header packet interrupt handler, points to the entry in the request queue 322 for which a transmission unit has just finished loading. The expected next write address pointer, NEXT, in the current request is incremented by the value SIZE from the header packet buffer 324, and now points to the write address expected for the next transmission unit. If the new value of the expected next write address pointer, NEXT, is equal to the ending address, END, of the module buffer 328, it is reset to the starting address, START, of the module buffer 328, in wrap-around fashion.

In block 344 it is determined whether the entire requested module has been loaded into memory. The value of the expected next write address pointer, NEXT, is compared to the value of the first loaded address, START. If they are the same, then the entire module has been loaded. In block 346, a message is sent, via the event manager, to the requesting application program to indicate that the requesting module has been completely retrieved, illustrated as a dashed line in FIG. 3. In addition, the request is removed from the request queue 322. If the value of the expected next write address NEXT is not the same as the first loaded address, START, the data complete interrupt handler returns (349), and the next transmission unit containing data for the requested module will be processed by the header packet interrupt handler, as described above. In either event, the current request pointer (CURR REQ) is cleared.

If some portion of a transmission unit is not properly received by the program component detector 30, then a subsequent header packet will be received before the data complete interrupt signal from the preceding header packet has been generated by the DMA circuitry in the program component detector 30. This, in turn, generates a subsequent header packet interrupt signal before the preceding data complete interrupt signal can be generated. Processing in the header packet interrupt handler and the data complete interrupt handler can cooperate to identify this situation and provide for handling such an error.

In the header packet interrupt handler, such processing is performed in block 338 (of FIG. 3), after the data packet DMA controller is enabled to receive the next transmission unit. For each header packet received, the expected next write address, NEXT, in the current request queue entry, previously updated by the data complete interrupt handler, is compared to the write address (START+OFFSET) for the newly received header packet. If they are the same, the previous transmission unit was successfully received. If, however, the last ending address is not the same as the new offset, that means that the DMA transfer of the previous transmission unit did not complete successfully. In this case, both the first write address, FIRST, and the expected next write address, NEXT, are updated to the current write address (START+OFFSET). That is, previously loaded transmission units are essentially discarded, and loading of the module is restarted with the current transmission unit. This form of recovering from a data missing type of error may take more time, because a transmission unit which was previously loaded successfully may result in an error when reloaded. However, by using this form of recovery, the tasks performed by the header packet interrupt handler and data complete interrupt handler are minimized, and only two pointers are needed in memory.

As a part of the module complete message handling, the event handler performs an error checking on the received module. For example, a cyclic redundancy check (CRC) code is transmitted as an embedded part of the module. The event handler calculates a CRC over the received module in the module buffer 328 in the RAM 412, and compares it to the embedded CRC. If the newly calculated CRC equals the embedded CRC, then the module was correctly received, otherwise an error occurred, and the module is reloaded, as described above.

When the requested module has been completely loaded into memory further processing by the application module may continue, illustrated in FIG. 3 by inference as a line from the bottom of the API call to the wait function 304. However, a separate task in the application program may be activated in response to the receipt of the message from that application program's message queue.

The above mentioned API includes functions for accessing the data stream by the application program, via the interpreter, or by the system loader. An application programmer will use the published API description to formulate an API call to access the desired data stream function. A first group of functions relates to the directory of modules. A first function, DIR_NEW, is a request for a new directory. As described above, in response to this API function, an allocation of memory is made, then a request is enqueued for the loading of the next directory module in the data stream, then the API function returns. When the directory has been loaded, a message is sent to the requesting program. Another function, DIR_FREE, frees the memory space taken by the current directory. The function DIR_SELECT indicated which directory module will be used in subsequent API calls. The function DIR_CURRENT returns a handle to the currently selected directory.

The functions DIR_SPY and DIR_STOP_SPY are similar to the DIR_NEW function. In response to a DIR_SPY API call, a request is enqueued in the request queue for a directory module, but instead of loading a directory module and sending a message when it is loaded, this function sends a message whenever a directory module is detected in the data flow (the directory module is not loaded). In addition, the request remains in the request queue until a DIR_STOP_SPY API call is made. When a DIR_STOP_SPY API call is made, the request queue is searched for the directory spy request, and that entry is removed. These functions are useful in spying any change from the current directory in the data stream. Finally there are API calls to extract information about the current directory: DIR_IDENTIFIER, DIR_REQUIREMENT and DIR_NB_MODULES.

Because of the embedded CRC code in the module, any memory allocation request for loading a module must take this code into account. Three API calls are provided to handle this. The function MODULE_ALLOC takes a module identifier as an argument and requests an allocation of the proper amount of memory to load that module, taking into account any CRC or other memory requirements. The function MODULE_FREE frees the memory taken by a module. MODULE_CHECK performs a CRC check of a loaded module and returns the result. This may be performed at any time because the CRC is embedded in the module as loaded in memory.

Another set of API calls deals with the modules, using the currently selected directory to identify them. There are API calls to extract information about a module: MODULE_REQUIREMENT, MODULE_SIZE and MODULE_FLAGS. These enable the system to determine whether a module may be loaded and/or executed. The function MODULE_RUN is used to load an executable module, as described above, create a new process, and begin execution at the entry point of the module. This function is used by the system loader to initiate AVI program execution. The function MODULE_CHAIN is used to load a subsequent executable module, end execution of the current module, and begin execution of the newly loaded module at its entry point. No new process is created in this case. The function MODULE_LOAD is used to load a module, but not start execution. As described above, a message is sent to the requesting program when the module loading has completed. The function MODULE_EXEC is used to create a new process and begin execution of a module, which was previously loaded by the MODULE_LOAD API call, at its entry point.

The function MODULE_LINK executes a new module using the current process, resources and variables. It allows for subroutine-like calls from within a module by providing a dynamic link to the new module. This permits AVI programs to be divided into smaller modules which may be dynamically linked only when necessary. The MODULE_LINK function maintains relocation and jump tables. The functions MODULE_SPY and MODULE_STOP_SPY operate similarly to the DIRECTORY_SPY and DIRECTORY_STOP_SPY but with respect to identified modules. The MODULE_SPY API call inserts an entry in the request queue including the identifier of the module. Whenever a header module with the same identifier is detected in the data stream, a message is sent to the requesting program. This continues until a MODULE_STOP_SPY API call is made. In response to the MODULE_STOP_SPY API call, the entry containing the spying request for the identified module is removed from the request queue. The MODULE_STOP_LOAD function stops any module loading request currently in process and removes the loading request entry from the request queue. The functions FLOW_MESSAGE and FLOW_STOP_MESSAGE respectively generate and remove a request for a message when a special signalling packet, relating to the data stream occurs, such as a suspended data flow or the end of the data flow. When such an event occurs, a message is sent to the requesting program.

Figure 5:
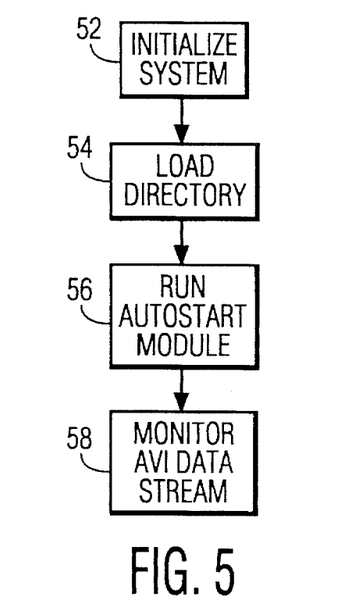
FIG. 5 is a flow diagram illustrating the initialization function of the system loader.

As described above, the system loader, performs system initialization and monitors the data stream to ensure that the execution of the application program is in synchronism with the received audio and video components. FIG. 5 is a flow diagram illustrating the initialization function of the system loader. In block 52 of FIG. 5, various hardware and software components of the decoder (of 20) are initialized. In addition, locations in the RAM 412 are allocated and initialized for various data structures. These initialization functions are well known, and depend upon other software components in the decoder. A system programmer will understand what hardware and software initializations are required, what data structures are required, and how to perform the initializations. Thus, this block will not be described in detail below.

In block 54 a DIR_NEW API call, described above, is made. This API call loads the next directory module appearing in the AVI program component packet service into an allocated buffer in the RAM 412. This API call returns to the system loader immediately, even though the directory may not be loaded into the RAM 412 until a later time. The system loader performs other functions and then, if necessary, a wait API call (not shown) until a message is received, via the event manager, indicating that the directory module has been loaded. In block 56, the resources available in the decoder (of FIG. 1) are compared to the data indicating the required resources, in the directory module. If the decoder has sufficient resources to execute the AVI program, a MODULE_RUN API call is made to load the autostart code module, identified in the previously loaded directory module, as described above. Again, the API call returns immediately, but the code module may not be completely loaded from the data stream until some later time. After the autostart code module is completely loaded, another task is created in a known manner using the multitasking kernel for executing the AVI program, via the interpreter.

Figure 6:
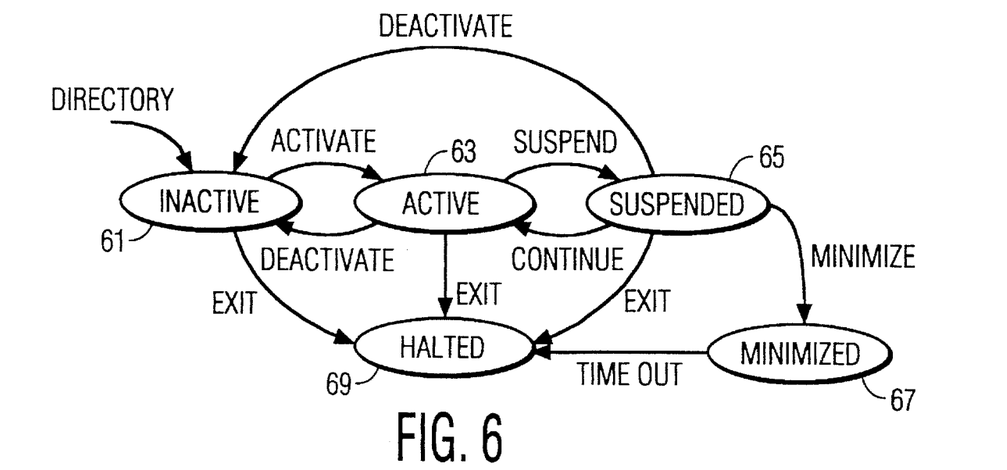
FIG. 6 is a state transition diagram illustrating the data stream monitoring function of the system loader.

In block 58, the system loader begins to monitor the AVI program component for execution signals, and directory changes, and controls the execution of the AVI program by sending messages to the AVI program as described below. FIG. 6 is a state transition diagram illustrating the monitoring function of the system loader, and is useful in understanding the operation of the system loader. If a directory is detected in an AVI program component packet service, then the program that the viewer has selected is an interactive program. Once the directory has been loaded into the RAM 412, and the autostart code module requested from the AVI component packet service, the AVI program, under the control of the system loader, enters the INACTIVE state 61. In the INACTIVE state 61, all the resources to start the application have been allocated and the application may be partially or completely loaded, but there is no interaction with the viewer. For example, while the autostart module is being loaded, the AVI program remains in the INACTIVE state 61. In addition, even after the autostart module has been loaded, the viewer may merely be changing channels through the channel carrying the AVI program and have no intention of interacting with the AVI program. Or the viewer may just wish to observe the AVI program before making a decision to join the interaction. In all these cases it is important that the remote control acts in a normal channel changing mode and not in an interactive mode. This is the purpose of the INACTIVE state 61. In order to notify the viewer that the channel being watched is broadcasting an interactive program, a special interactive program logo or icon is overlaid upon the AVI video.

In order for a viewer to actually begin to interact with the AVI program, a special key, called "ACTIVATE KEY" below, is provided on the remote control. When the interactive program logo or icon is displayed, the viewer may press the ACTIVATE KEY. The system loader, in response to the ACTIVATE KEY press, sends an ACTIVATE message to the AVI program which, then, enters the ACTIVE state 63. In the ACTIVE state 63, the interpreter actually begins to execute the previously loaded AVI program at its entry point. When the autostart module of the AVI program begins execution, it allocates and initializes its own data structures in the RAM 412, loads other code and/or data modules and controls all user actions from the remote control and front control panel.

Because the A VI program controls all user interaction, it can prevent the user from changing channels or performing other normal remote control functions. In order to revert to normal remote control functions, the viewer must first stop the current AVI program. The viewer presses the ACTIVATE KEY, again, to deactivate the program. In response to this key press, the system loader sends a DEACTIVATE message to the executing AVI program, which, then, leaves the ACTIVE state 63, and returns to the INACTIVE state 61. Again, the special interactive program logo or icon is displayed, indicating that the AVI program is loaded but not executing. The viewer may, then, change channels or perform other normal remote control functions, or may reactivate the AVI program by pressing the ACTIVATE KEY again. The ACTIVATE KEY, thus, acts as a toggle to switch between the ACTIVE state 63 and the INACTIVE state 61 when it is pressed. The ACTIVATE and DEACTIVATE messages may also be thought of as ACTIVATE TOGGLE messages, whose meaning (ACTIVATE or DEACTIVATE) depends upon the state of the AVI program (INACTIVE or ACTIVE, respectively) when the ACTIVATE KEY is pressed.

While the AVI program is executing in the ACTIVE state 63, there are times when it is desired to suspend its execution. For example, when a non-interactive commercial is to be transmitted, the transmitted audio and video will no longer match the sound and graphics being generated by the decoder 10 (of FIG. 1), and it is desired to allow the viewer to use the remote control in its normal manner. The application programmer, however, cannot know in advance when such suspensions will be required. Thus, in this case, the broadcaster, independent of the AVI program, may repetitively include special signal packets (as described above), called suspend signal packets, in the AVI program component packet service. Each such packet contains data directing that the currently executing AVI program is to suspend execution.

The system loader, via a FLOW_MESSAGE API call, receives a message whenever such packets are recognized in the AVI program component packet service. For example, when a suspend signal packet is received, the system loader receives a suspend signal message, and, in response to the first suspend signal message, sends a SUSPEND message to the AVI program, which, in turn, suspends execution, entering the SUSPENDED state 65. In the SUSPENDED state 65, execution of the AVI program halts in such a manner that it may be started again from the point where it was suspended. That is, all the resources necessary to execute the AVI program remain allocated, and the execution state of the AVI program is stored in a location in the RAM 412. In addition, a second logo or icon, indicating that a previously executing interactive program is suspended, but ready to resume when allowed, is overlaid over the current video image.

When the interruption (e.g. non-interactive commercial) is over, the broadcaster stops including the suspend signal packets in the AVI program component packet service. The system loader, after a predetermined period of time without receiving a suspend signal message, sends a CONTINUE message to the AVI program, which, in turn, resumes execution from where it was previously suspended, entering the ACTIVE state 63, described above.

An alternative embodiment of the SUSPEND/CONTINUE signalling arrangement, described above, is for the broadcaster to include a single suspend signal packet in the AVI program component packet service when it is desired to suspend execution of the AVI program. The broadcaster, then, includes another special signal packet, called a continue signal packet, in the AVI program component packet service when it is desired to resume execution of the AVI program. This packet contains data directing the currently suspended AVI program to resume execution. The system loader recognizes the continue signal packet, and sends a CONTINUE message to the AVI program, which resumes execution and enters the ACTIVE state 63, as described above.

It is also possible for a viewer to stop the execution of a suspended AVI program. When the program suspended logo or icon is displayed, the viewer may press the ACTIVATE KEY. The system loader, responsive to this key press, sends a DEACTIVATE message to the suspended AVI program, which in turn, enters the INACTIVE state 61, described above. From the INACTIVE state 61, the program may only resume execution when the viewer presses the ACTIVATE KEY, causing the system loader to send an ACTIVATE message to the AVI program, which will, then, enter the ACTIVE state 63. If the system loader is still receiving suspend signal packets, another SUSPEND message is immediately sent to the AVI program which, again, enters the SUSPENDED state 65. The INACTIVE state 61, ACTIVE state 63 and SUSPENDED state 65 are the states among which the AVI program may switch in response to messages sent to it from the system loader. However, there are two other states which are entered under the direct control of the system loader.

An AVI program can reach an end of its execution. For example, the broadcaster may include another special signal packet, called an end execution signal packet, in the AVI program component packet service. The system loader receives an end execution message when an end execution signal packet is recognized in the AVI program component packet service, via the FLOW_MESSAGE API call. In response to the end execution message, the system loader sends an EXIT message to the AVI program. Regardless of what state the AVI program is in, INACTIVE 61, ACTIVE 63 or SUSPENDED 65, the AVI program responds to the EXIT message by deallocating all its resources, and removing all record of itself from the decoder 10 (of FIG. 1). The program is deemed to have entered the HALTED state 69, and disappears from the decoder 10. In some cases, the program itself can recognize that its execution has reached an end, either via a user command, or by its own execution. When the AVI program recognizes that its execution has ended, it performs the same processing that it would have performed had an EXIT message been received, and it enters the HALTED state 69 on its own accord.

When an AVI program is in the SUSPENDED state, it is possible that a different interactive AVI program will be received on the AVI program component data flow. For example, if the AVI program was suspended for a commercial, that commercial may itself be an interactive program, or the user may have changed channels to a channel broadcasting a different AVI program. In both these cases, the new AVI program will include a directory module, which is different from that for the suspended AVI program.

The system loader, via the DIR_SPY API call, receives a message whenever a directory is detected in the AVI program component packet service. The system loader compares the currently active directory to the just detected directory. When the system loader recognizes that a different directory is present in the AVI program component packet service, it begins to load the AVI program represented by that directory.

First, a message is sent to the currently suspended AVI program to indicate that the program component packet service no longer is broadcasting its program, or that the program has 'lost the flow.' This message is a request for the currently executing program to minimize itself, i.e. is a MINIMIZE message. In response to the MINIMIZE message, the currently suspended AVI program first stores its current execution state and environment in a small block of the RAM 412 containing the identification of the AVI application, and a time duration, which will be described below. Then the suspended AVI program begins to deallocate is resources. A minimized AVI program does not include any code, and, thus, cannot change states in response to messages, or restart itself.

The system loader then loads the newly detected directory and autostart module and places the new AVI program in the INACTIVE state 61 displaying the interactive program logo or icon, as described above. The viewer can then start and stop interaction with this new AVI program by pressing the ACTIVATE KEY, and the program may, itself be suspended and continued.

The minimizing process is a recursive process. For example, this new AVI program, if suspended, may also be minimized if yet another AVI program is detected in the AVI program component packet service. In this case, another block of memory is allocated, and the execution state and environment of this AVI program, along with its identifier and a time duration, is stored in this memory block. Then the newly detected AVI program is loaded, as described above. The number of programs which may simultaneously be minimized is limited only by the amount of memory required to store all the memory blocks containing the executions states and environments of the minimized programs.

If there is not have enough available memory space to load the new directory module, or execute the program represented by a previously loaded directory module, and if there are memory blocks allocated representing minimized programs, the system loader may automatically deallocate some or all of the memory blocks according to an algorithm (such as deallocating the oldest memory block first, or first deallocating memory blocks marked as expendable by the originating application) in an attempt to derive sufficient memory space. Alternatively, the system loader may present a list of minimized applications to the viewer, and allow the viewer to select some or all for deletion. Blocks representing selected minimized applications are then deallocated to derive sufficient memory space.

In the meantime, the memory blocks containing the execution states and environments of previously minimized AVI programs remain allocated in memory. As described above, there is a time duration in each such memory block. If the time duration in any block is exceeded, then that previously minimized AVI program times out. In this case, that program is considered to have entered the HALTED state 69, and its block of memory containing the execution state and environment is deallocated, and all record of that previously minimized AVI program is lost.

However, it is possible for the decoder 10 (of 26) to again receive an AVI program component containing the directory, code and data modules of a previously minimized AVI program, or for that AVI program to 'regain the flow.' For example, the interactive commercial may have terminated, entering the HALTED state 69, or the viewer may have changed the channel back to this channel. The system loader begins to load the 'new' directory in the AVI program component packet service. Whenever a new directory is loaded, the application identifier is compared to the identifiers in all blocks containing execution state and environments currently stored in the RAM 412. If a matching block is found, then the code and data modules are loaded, and the AVI program placed in the INACTIVE state 61, but its execution state is updated to that just before it was minimized. When the viewer presses the ACTIVATE KEY, the AVI program enters the ACTIVE state 63, and begins execution where it previously left off. In this manner, an AVI program may be temporarily stopped to run another AVI program, and then resumed, without requiring sufficient resources for both programs to remain in memory simultaneously.

What is claimed is:

1. In an audio video interactive (AVI) receiver receiving a packet service including a plurality of modules, each module having a name and including time multiplexed transmission units, each transmission unit including a header packet containing the name of the module, a method for processing modules comprising steps of:

receiving a request to perform a process on a module identified by a name and inserting in a list of entries an entry containing the received name and requested process;

detecting a header packet in the packet service;

determining if the name in the detected header packet matches a name in an entry in the list;

performing the process in the matching entry if there is a matching entry; and sending a message indicating that the process has been performed.

2. The method of claim 1 wherein:

the receiving step includes the step of receiving a request to process a complete module; and the sending step includes the step of removing the matching entry from the list when the complete module has been processed.

3. The method of claim 1 further comprising the step of receiving a request to stop performing a process on a module identified by a name and removing from the list of entries the entry containing the received name and requested process.

4. The method of claim 1 wherein:

each transmission unit further comprises a plurality of data packets associated with each header packet;

the receiving step includes steps of:

receiving a request to process the module by loading the module into a memory; and allocating a buffer in the memory to contain the module; and the performing step includes the steps of:

storing each data packet associated with the detected header packet in a respective location in the allocated buffer; and removing the matching entry in the list when each data packet in each transmission unit in the module has been stored in the allocated buffer.

5. The method of claim 4, wherein:

the plurality of data packets associated with each header packet in a transmission unit contain data in the module located at a respective offset location from the beginning of the module;

the header packet further contains the offset location of the data in the associated plurality of data packets; and the storing step stores the associated plurality of data packets in the allocated buffer at an offset location equal to the offset location in the header packet.

6. The method of claim 5 wherein:

the packet service continuously and repetitively provides modules carried by successive time multiplexed transmission units containing module data located at sequential offset locations from the beginning of the module;

the detecting step further includes the step of setting a write pointer to the offset location in the detected header packet;

the performing step further comprises the step of saving the offset location in a first detected header packet after a request to load a module has been received as a beginning load location; and the storing step comprises the steps of:

storing each data packet associated with a detected header packet in the location pointed to by the write pointer;

then updating the write pointer to point to the next sequential location in the allocated buffer after the data packet has been stored;

then comparing the write pointer to the stored beginning load location and performing the removing step when they are equal.

7. The method of claim 6 wherein the detecting step further includes, before the setting step, the steps of:

comparing the write pointer to the offset location in the detected header packet; and replacing the beginning load location with the offset location in the detected header packet if they are not equal.

8. The method of claim 4 wherein:

each module further includes an embedded error detection code;

the storing step stores the embedded error detection code in the allocated buffer; and the sending step further includes the steps of:

checking the data in the allocated buffer to detect an error using the embedded error detection code;

sending an error message if an error is detected in the checking step; and sending a module-loaded message otherwise.

9. The method of claim 8, wherein:

the embedded error detection code is an embedded cyclical redundancy check (CRC) code; and the checking step calculates a CRC value for the data in the allocated buffer, compares the calculated CRC value to the embedded CRC code and detects an error if they are different.

10. The method of claim 4 wherein each transmission unit further comprises a plurality of data packets;

the receiving step includes storing each data packet associated with the detected header packet;

determining if all data packets of a stored transmission unit are error free; and discarding the entire transmission unit if all data packets of the transmission unit are not error free.

11. The method of claim 1 wherein:

the receiving step includes the step of receiving a request to spy a module in the packet service; and the performing step includes the step of sending a message whenever there is a matching entry.

12. An audio video interactive (AVI) receiver, comprising:

a source of a packet data stream including a plurality of modules, each module having a name and including time multiplexed transmission units, each transmission unit including a header packet containing the name of the module;

a memory for storing a request queue containing a plurality of entries each including a processing request and a name of a module, and a header packet buffer including a location containing a module name;

request processing circuitry, coupled to the memory, for receiving a request to perform processing on a module identified by a name and storing an entry in the request queue including the name of the identified module and the processing requested;

a header packet memory storage controller, coupled between the data stream source and the memory, for storing header packets in the header packet buffer as they appear in the data stream, and generating a header packet received signal; and module processing circuitry, responsive to the header packet received signal, for reading the module name from the header packet buffer, comparing the module name to the names in each entry in the request buffer, and if the module name matches an entry name, performing the processing requested in the matching request queue entry, then sending a message.

13. The receiver of claim 12 wherein the module processing circuitry comprises a processor, and the header packet received signal is an interrupt signal for the processor.

14. The receiver of claim 12, wherein the header packet memory storage controller is a direct memory access (DMA) controller.

15. The receiver of claim 12, wherein:

the request processing circuitry receives a request to perform processing on a complete module; and the module processing circuitry removes the request queue entry after performing the processing requested on the complete module.

16. The receiver of claim 15, wherein:

the memory further stores a module buffer;

the data stream source produces transmission units each further including a plurality of data packets associated with the header packet included in the transmission unit;

the receiver further comprises a module memory storage controller, coupled between the data stream source and the memory, for selectively storing the plurality of data packets from a transmission unit in the module buffer as they appear in the data stream, then generating a data complete signal, in response to an enable signal;

the request processing circuitry receives a processing request to load a complete module, identified by a name, and stores an entry in the request queue containing the identified name and load request; and the module processing circuitry generates the enable signal if the module name matches an entry name and is responsive to the data complete signal to remove the request queue entry after the complete module is loaded into the module buffer.

17. The receiver of claim 16 wherein:

the data stream source produces each module including an embedded error detection code; and the module processing circuitry error checks the data in the module buffer after the complete module is loaded into the module buffer using the embedded error detection code, and sends an error message if an error is detected, and a module-loaded message otherwise.

18. The receiver of claim 17, wherein the embedded error detection code is a cyclical redundancy check (CRC) code and the module processing circuitry calculates a CRC value for the data in the module buffer, compares the calculated CRC value to the embedded CRC code and detects an error if they ar different.

19. The receiver of claim 16 wherein:

the data stream source produces successive transmission units containing module data located at sequential offset locations from the beginning of the module, and produces the header packet further containing the offset location of the data in the associated data packets;

the header packet buffer in the memory further includes a location containing the offset location;

the module processing circuitry extracts the offset location from the header packet buffer, and supplies it to the module memory storage controller; and the module memory storage controller initializes a write pointer with the offset location from the module processing circuitry, loads each data packet into a location in the module buffer pointed to by the write pointer, then updates the write pointer to point to the next sequential location in the module buffer, until all the data packets in a transmission unit have been loaded, then generates the data complete signal.

20. The receiver of claim 19 wherein:

the data stream source continuously and repetitively produces modules;

the memory further contains a beginning load address location; and the module processing circuitry extracts the offset location from the header packet buffer after the header packet causing a first match has been loaded and saves the offset location in the beginning load address location, and, responsive to the data complete signal from the module memory storage controller, compares the write pointer from the module memory storage controller to the beginning load address location, and sends the message if they are equal.

21. The receiver of claim 20 wherein the module processing circuitry, responsive to the header packet received signal, compares the offset location to the write pointer, and replaces the beginning address location with the offset location if they are not equal.

22. The receiver of claim 16 wherein the module processing circuitry comprises a processor, and the data complete signal is an interrupt signal for the processor.

23. The receiver of 16 wherein the module memory storage controller is a direct memory access (DMA) controller.

24. The receiver of claim 12, wherein the request processing circuitry further receives a request to stop processing of a module identified by a name and removes the entry in the request queue including the name of the identified module and the processing requested to stop.

25. The receiver of claim 12, wherein:

the header packet memory storage controller selectively stores header packets in response to an enable signal;

the request processing circuitry generates the enable signal after an entry is stored in the request queue; and the module processing circuitry further removes the enable signal after the processing has been performed if there are no entries in the request queue.

\* \* \* \* \*